United States Patent
Rankin

(10) Patent No.: US 11,652,732 B2
(45) Date of Patent: May 16, 2023

(54) SYSTEM AND METHOD FOR SCATTERING NETWORK TRAFFIC ACROSS A NUMBER OF DISPARATE HOSTS

(71) Applicant: John Rankin, Morgantown, WV (US)

(72) Inventor: John Rankin, Morgantown, WV (US)

(73) Assignee: Rankin Labs, LLC, Williamsport, OH (US)

( * ) Notice: Subject to any disclaimer, the term of this patent is extended or adjusted under 35 U.S.C. 154(b) by 485 days.

(21) Appl. No.: 16/546,379

(22) Filed: Aug. 21, 2019

(65) Prior Publication Data
US 2020/0067820 A1    Feb. 27, 2020

Related U.S. Application Data

(60) Provisional application No. 62/720,155, filed on Aug. 21, 2018.

(51) Int. Cl.
*H04L 45/16* (2022.01)
*H04L 69/16* (2022.01)
*H04L 45/00* (2022.01)

(52) U.S. Cl.
CPC ........... *H04L 45/16* (2013.01); *H04L 45/20* (2013.01); *H04L 45/34* (2013.01); *H04L 69/16* (2013.01)

(58) Field of Classification Search
CPC ......... H04L 69/16; H04L 45/16; H04L 45/70; H04L 45/74; H04L 45/20; H04L 45/34; H04L 41/0866; H04L 63/20; H04L 63/1425; H04L 67/306; H04L 63/1416; G06F 16/2358; G06N 3/088
See application file for complete search history.

(56) References Cited

U.S. PATENT DOCUMENTS

| 3,688,090 A | 8/1972 | Rankin |
| 6,023,724 A | 2/2000 | Bhatia et al. |
| 6,567,416 B1 | 5/2003 | Chuah |
| 6,714,985 B1 | 3/2004 | Malagrino et al. |

(Continued)

FOREIGN PATENT DOCUMENTS

CN       103841118 A       6/2014

OTHER PUBLICATIONS

Thyer, J., Covert Data Storae Channel Using IP Packet Headers, SANS Institute, Information Security Reading Room, Jan. 30, 2008.

(Continued)

*Primary Examiner* — Oussama Roudani
(74) *Attorney, Agent, or Firm* — Standley Law Group LLP; Jeffrey S. Standley; Adam J. Smith

(57) ABSTRACT

A system and method for scattering network traffic across a number of disparate hosts is provided. Each gateway located along a real transmission pathway between a real point of origin and a real point of destination is identified. A network and a sub-network for each gateway is identified. At least one host along the real transmission pathway is used to observe network traffic for a number of illusionary hosts, each having network addresses appearing to be plausibly located along the real transmission pathway. A host having aggregate network traffic data deviating the most from a mean value for all hosts is selected. The network address for the selected host is used as the source address of an outgoing IP datagram.

15 Claims, 3 Drawing Sheets

(56) References Cited

U.S. PATENT DOCUMENTS

| | | |
|---|---|---|
| 6,757,248 B1 | 6/2004 | Li et al. |
| 7,103,025 B1 | 9/2006 | Choksi |
| 7,215,684 B1 | 5/2007 | Rosen et al. |
| 8,374,091 B2 | 2/2013 | Chiang |
| 8,397,151 B2 | 3/2013 | Salgado et al. |
| 8,577,038 B2 | 11/2013 | Kameda et al. |
| 9,350,663 B2 | 5/2016 | Rankin |
| 10,574,439 B2 | 2/2020 | Rankin et al. |
| 10,725,743 B2 | 7/2020 | Rankin |
| 10,728,220 B2 | 7/2020 | Rankin |
| 2001/0017844 A1 | 8/2001 | Mangin |
| 2001/0019614 A1 | 9/2001 | Madoukh |
| 2002/0041592 A1 | 4/2002 | Van Der Zee et al. |
| 2002/0054570 A1 | 5/2002 | Takeda |
| 2002/0071436 A1 | 6/2002 | Border et al. |
| 2002/0114341 A1 | 8/2002 | Sutherland et al. |
| 2003/0031198 A1 | 2/2003 | Currivan et al. |
| 2003/0223582 A1 | 12/2003 | Dagan |
| 2005/0058129 A1 | 3/2005 | Jones et al. |
| 2005/0265126 A1 | 12/2005 | Izawa et al. |
| 2005/0286517 A1 | 12/2005 | Babbar et al. |
| 2006/0002681 A1 | 1/2006 | Spilo et al. |
| 2006/0034317 A1 | 2/2006 | Hong et al. |
| 2006/0133364 A1 | 6/2006 | Venkatsubra |
| 2006/0133377 A1* | 6/2006 | Jain ............... H04L 63/1441 370/392 |
| 2006/0259587 A1 | 11/2006 | Ackerman et al. |
| 2007/0028121 A1 | 2/2007 | Hsieh |
| 2007/0223395 A1 | 9/2007 | Lee et al. |
| 2008/0127335 A1* | 5/2008 | Khan ............... H04L 63/1425 707/999.107 |
| 2010/0103830 A1 | 4/2010 | Salgado et al. |
| 2011/0099631 A1* | 4/2011 | Willebeek-LeMair ............... H04L 43/028 726/23 |
| 2011/0149891 A1 | 6/2011 | Ramakrishna |
| 2011/0231564 A1 | 9/2011 | Korsunky et al. |
| 2012/0117376 A1 | 5/2012 | Fink et al. |
| 2012/0243539 A1 | 9/2012 | Keesara |
| 2012/0289250 A1 | 11/2012 | Fix et al. |
| 2012/0300648 A1 | 11/2012 | Yang |
| 2012/0307678 A1 | 12/2012 | Gerber et al. |
| 2013/0028121 A1 | 1/2013 | Rajapakse |
| 2013/0058231 A1 | 3/2013 | Paddon et al. |
| 2013/0091102 A1 | 4/2013 | Nayak |
| 2013/0343377 A1 | 12/2013 | Stroud et al. |
| 2014/0025806 A1* | 1/2014 | Robitaille .......... H04L 63/0414 709/224 |
| 2014/0100014 A1 | 4/2014 | Bennett, III et al. |
| 2014/0254598 A1 | 9/2014 | Jha et al. |
| 2014/0294019 A1 | 10/2014 | Quan et al. |
| 2015/0100613 A1 | 4/2015 | Osiecki et al. |
| 2015/0113028 A1 | 4/2015 | Boppana et al. |
| 2015/0229714 A1 | 8/2015 | Venkatsubra et al. |
| 2016/0241388 A1 | 8/2016 | Ross |
| 2016/0269294 A1 | 9/2016 | Rankin |
| 2016/0366160 A1* | 12/2016 | Kapoor ............... H04L 63/1425 |
| 2017/0090872 A1 | 3/2017 | Mathew et al. |
| 2017/0244560 A1 | 8/2017 | Brandstatter |
| 2017/0351575 A1 | 12/2017 | Baker et al. |
| 2018/0018147 A1 | 1/2018 | Sugawara |
| 2018/0102975 A1 | 4/2018 | Rankin |
| 2019/0265951 A1 | 8/2019 | Rankin et al. |
| 2019/0319876 A1* | 10/2019 | Gumaste ............... H04L 45/28 |
| 2020/0177369 A1 | 6/2020 | Rankin et al. |
| 2020/0241960 A1 | 7/2020 | Yanovsky et al. |
| 2020/0358791 A1 | 11/2020 | Rankin |

OTHER PUBLICATIONS

Information Sciences Institute, University of Southern California, RFC 791, Internet Protocol, DARPA Internet Program Protocol Specification, Sep. 1981.

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

Rabah, K., Steganography—The Art of Hiding Data, Information Technology Journal, 2004, pp. 245-269.

Brown, J. et al., ARP Coaching Poisoning and Routing Loops in ad Hoc Networks, Mobile Networks and Applications, pp. 1306-1317, 2018.

Hansen, R. et al., Covert6: A Tool to Corroborate the Existence of IPv6 Covert Channels, Annual ADFSL Conference on Digital Forensics, Security Law, 2016.

Mileva, A. et al., Covert Channels in TCP/IP Protocol Stack—extended version—, Central European Journal of Computer Science, 2000.

York, D., Flooding Attack, Science Direct, 2021.

* cited by examiner

SYSTEM AND METHOD FOR SCATTERING NETWORK TRAFFIC ACROSS A NUMBER OF DISPARATE HOSTS

CROSS-REFERENCE TO RELATED APPLICATIONS

This application claims the benefit of U.S. Provisional Application Ser. No. 62/720,155 filed Aug. 21, 2018, the disclosures of which are hereby incorporated by reference as if fully restated herein.

TECHNICAL FIELD

Exemplary embodiments relate generally to a system and method for scattering network traffic across a number of disparate hosts.

BACKGROUND AND SUMMARY OF THE INVENTION

Two of the most important communication protocols used on the Internet and other similar networks are the Transmission Control Protocol (TCP) and the Internet Protocol (IP). Together, the TCP and IP protocols form core protocols of the larger Internet protocol suite used on packet-switched networks. That protocol suite is commonly referred to as the TCP/IP protocol because of the widespread adoption and implementation of the TCP and IP protocols.

The TCP/IP protocol was developed for the United States Advanced Research Projects Agency (ARPA). The TCP/IP protocol is a set of rules that enable different types of network-enabled or networked devices to communicate with each other. Those network devices communicate by using the TCP/IP standard, or format, to transfer or share data. TCP/IP rules are established and maintained by the Internet Engineering Task Force (IETF). The IETF is an international community of network designers, operators, vendors, and researchers concerned with the Internet's architecture and operation. The IETF's mission is to produce technical and engineering documents that influence the way people design, use and manage the Internet with the goal of improving its operations and efficiencies. These documents include protocol standards, best current practices and information updates of various kinds, and are commonly referred to as Request for Comments (RFC).

TCP can be used to establish a bi-directional connection between two clients wherein activity begins with a request for information made by one client to another client. A "client" is any program or application that initiates requests for or sends information from one remote location to another. As used herein, the term "client" may refer to such applications including, but not limited to, web browsers, web servers, file transfer protocol (FTP) programs, electronic mail programs, line printer (LPR) programs also known as print emulators, mobile phone apps, and telnet programs also known as terminal emulators, all of which operate conceptually in an application layer.

The TCP protocol is typically implemented as a "daemon" that is part of a TCP/IP stack of protocol layers. A daemon—also often referred to interchangeably as a server or service—is generally a software component of a device that runs a background process. As used herein in relation to the operation of the TCP protocol, the term "daemon" is used to refer to a component of a networked device that sends (source daemon) or receives (destination daemon), and processes communications between remote clients according to the TCP standard.

A host is a device or system that runs or executes TCP/IP daemons. As used herein, the term "host" refers to any such device or system including, but not limited to, a server platform, a personal computer (PC), and any other type of computer or peripheral device that implements and runs TCP software. Generally, a host physically connects and links clients and daemons to TCP/IP networks, thereby enabling communication between clients.

TCP software accepts requests and data streams directly from clients and other daemons, sequentially numbering the bytes, or octets, in the stream during the time the connection is active. When required, it breaks the data stream into smaller pieces called segments (sometimes referred to as datagrams or packets generally) for transmission to a requesting client. The protocol calls for the use of checksums, sequence numbers, timestamps, time-out counters and retransmission algorithms to ensure reliable data transmission.

The IP layer actually performs the communication function between networked hosts. The IP software receives data segments from the TCP layer, ensures that the segment is sized properly to meet the requirements of the transmission path and physical adapters (such as Ethernets and CTCs). IP changes the segment size, if necessary, by breaking it down into smaller IP datagrams, and transmits the data to the physical network interface or layer of the host.

The IP layer is responsible for delivering an IP datagram over an IP network using the destination IP address contained within the IP header. This network traffic originates with a host and is passed from gateway to gateway until it reached its final destination. While the source IP address contained within the IP header is important for higher level protocols, it is not absolutely necessary for some specialized applications; furthermore, the source address allows ICMP error messages to be directed to the point of origination so that network corrections can occur.

IP traffic is processed through a complex network of hosts and gateways using the IP address and its specific subsections. In order to guide connections to a host, there are generally three levels of identification contained within an IP address: network, subnetwork, and host. These identifications can be determined through an examination of the first few bits of the IP address and specific knowledge of the structure of a particular network.

The first identification is the network number which is either 7 bits, 16 bits, or 21 bits of the 32-bit IP address depending upon the value of the high order bits being 0, 10, or 110 respectively. This provides for flexibility in assigning addresses to networks and allows for the large number of small to intermediate sized networks the ability to modify the address field to specify a small number of networks with a large number of hosts, a moderate number of networks with a moderate number of hosts, or a large number of networks with a small number of hosts.

TABLE 1

| High Order of Bits | Format | Class |
| --- | --- | --- |
| 0 | 7 bits of net, 24 bits of host | A |
| 10 | 14 bits of net, 16 bits of host | B |
| 110 | 21 bits of net, 8 bits of host | C |

The host number can be further subdivided in subnet and host through the application of a subnet mask. However, the specific knowledge concerning the value or specification of subnet mask is usually contained locally and not generally available to a wider network audience. Therefore, the host number must be assumed to fully identify the final destination by the host of origin.

IP traffic generally flows between hosts over a dynamically connected path. While it is often the case that traffic patterns are repeatable, the nature of routing allows for a dynamic alteration and configuration of transmission pathways to occur. It is possible for an IP datagram to be passed from point to point and reach as many as 255 gateways between the source and the destination. While these are theoretical limits, the number of network segments used in practice can be surprisingly large.

This flow of traffic is both observable and measurable, from not only either end, but also by gateway observers positioned along the path. Since most connections are bi-directional, the data for collection and observation may include the size, frequency, and timing of transmissions. An intended flow of communication can be identified and distinguished from disjointed background traffic through the correlations between the size and frequency of the traffic flow. Therefore, a stream of data that represents a significant volume or size of data that is frequently transmitted is clearly a pattern of mono- or bi-directional communication between hosts. What is needed is a system and method for scattering network traffic across a number of disparate hosts.

What is provided is a system and method for scattering network traffic across a number of disparate hosts. The disclosed system and method may allow the true network structure, such as the real origin host and real destination host, to be disguised or obfuscated. The present disclosures provide a system and method which may be used to create the appearance that network traffic, such as but not limited to IP network traffic, is originating in a disparate number of locations within the network. This disparate scattered activity is designed to fall outside of correlatable standard behavior in ways that both obscures its occurrence and does not draw attention by its intentionally scattered behavior. This system and method allows network traffic to flow in a manner that masks its true behavior and creates the illusion that no network flow is intentionally occurring, such as between a true origin host and a true destination host.

In order to avoid observation, it would be preferable not to engage any higher-level protocols that require the integrity of the source address to be maintained. In other words, it would be preferable to not use flow control protocols like TCP. Furthermore, a system and method to disperse the appearance of traffic so that network correlations fail to observe activity would preferably be implemented.

By applying correlation coefficients against collected network data, a system and method may be provided by which there is no observation that would indicate a coherent communication path. In this way, it is possible to establish a system and method that allows communication to occur between hosts while not appearing as natural traffic.

Each gateway located along the real transmission pathway may be identified. The number of networks along the real transmission pathway may be determined. A list of observed hosts may be built. Illusionary hosts may be added. Traffic data may be collected to determine aggregate, frequency, and volume metrics. The mean and standard deviation of the traffic may be determined. If no host is available that has an aggregate value for its traffic which falls outside of the mean for the entire system by more than the standard deviation, then additional illusionary hosts may be added. If a host is available that has an aggregate value for its traffic which falls outside the mean by at least the standard deviation for the entire system, then the host with the aggregate value furthest from the mean value for the entire system may be selected. The source address of a datagram may be modified with the network address of the selected host.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which.

DETAILED DESCRIPTION OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
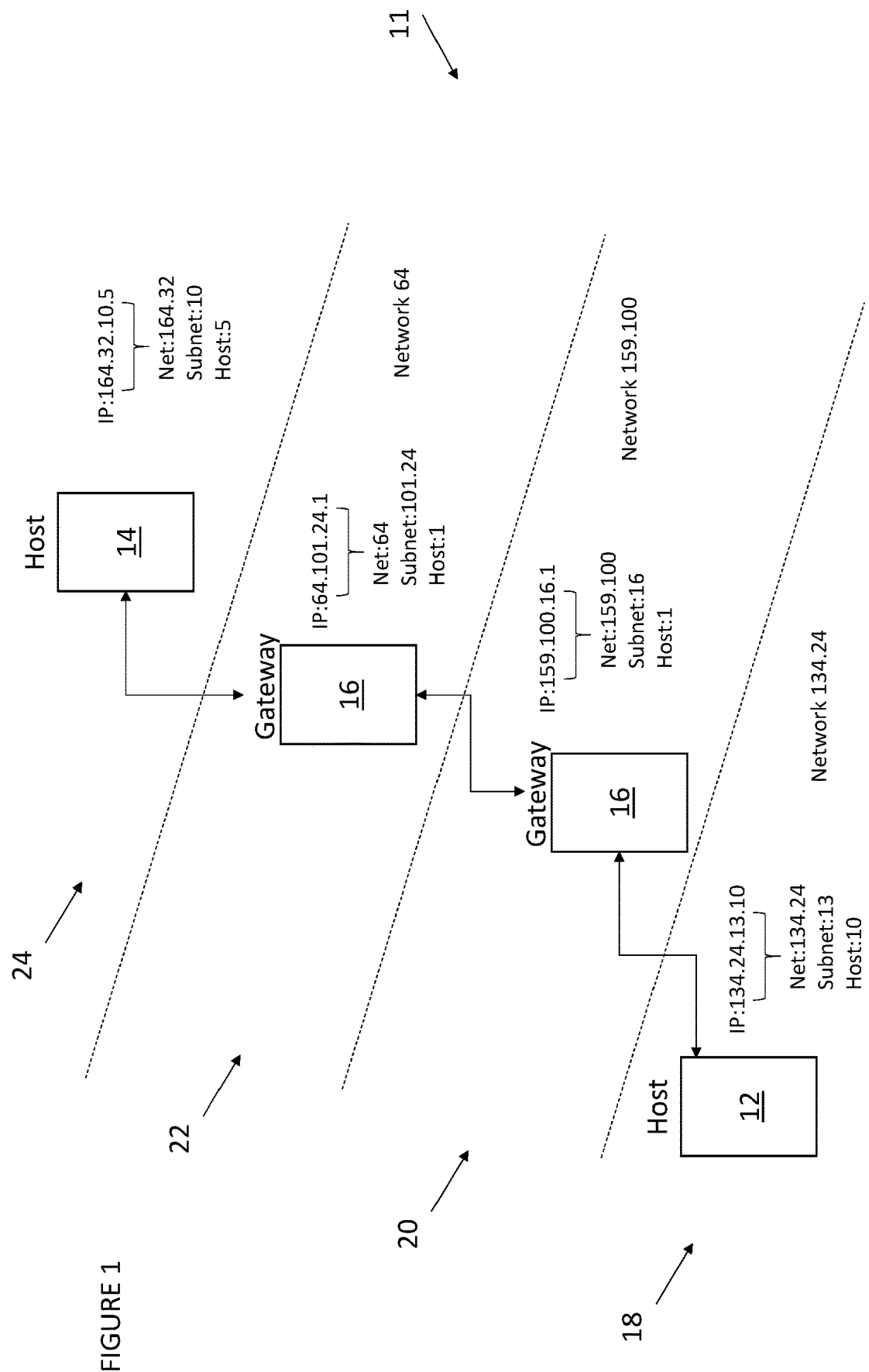
FIG. 1 is a simplified diagram illustrating an exemplary real network pathway.
Figure 2:
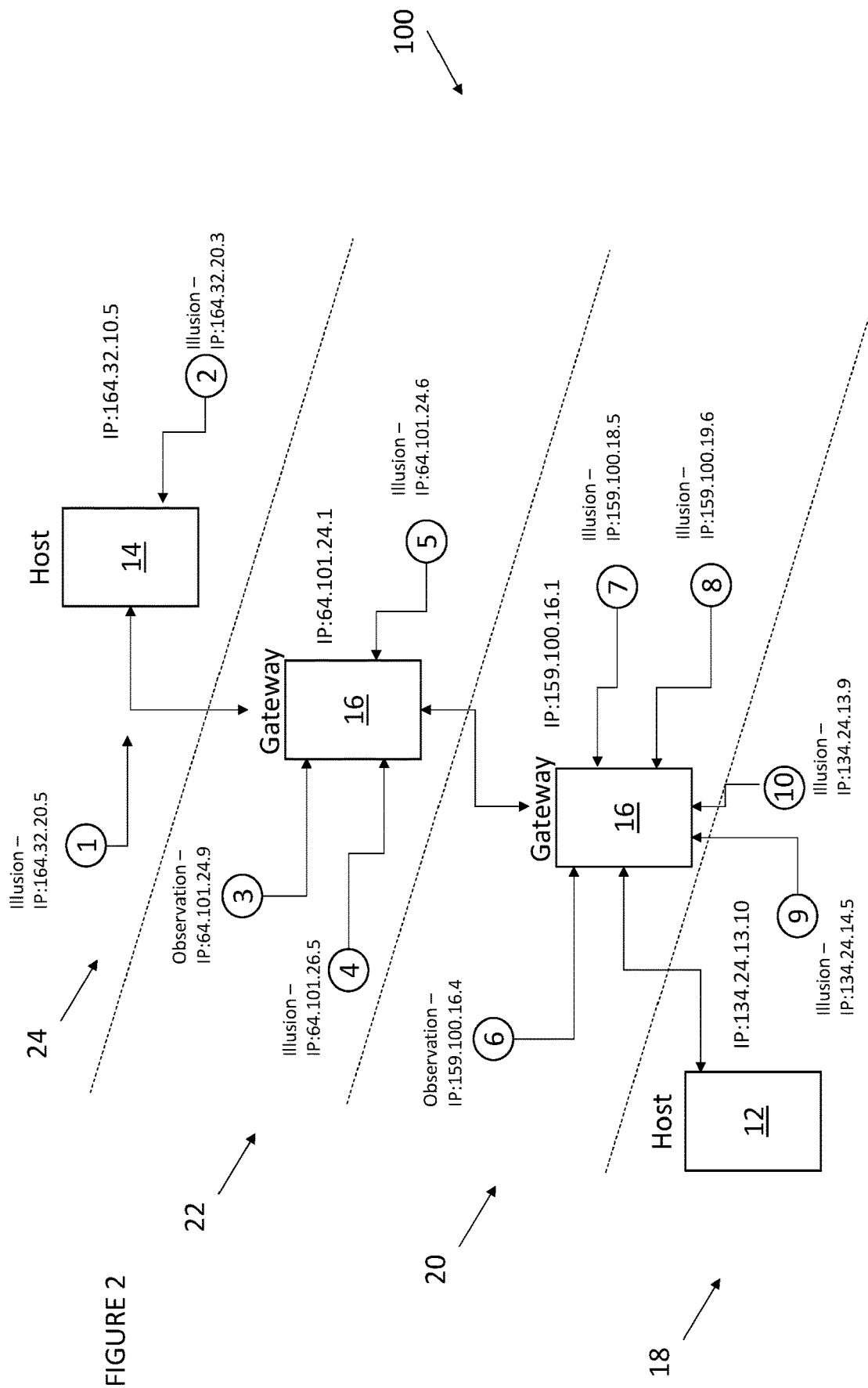
FIG. 2 is a simplified diagram illustrating the real network pathway of FIG. 1 with exemplary illusion network pathways.
Figure 3:
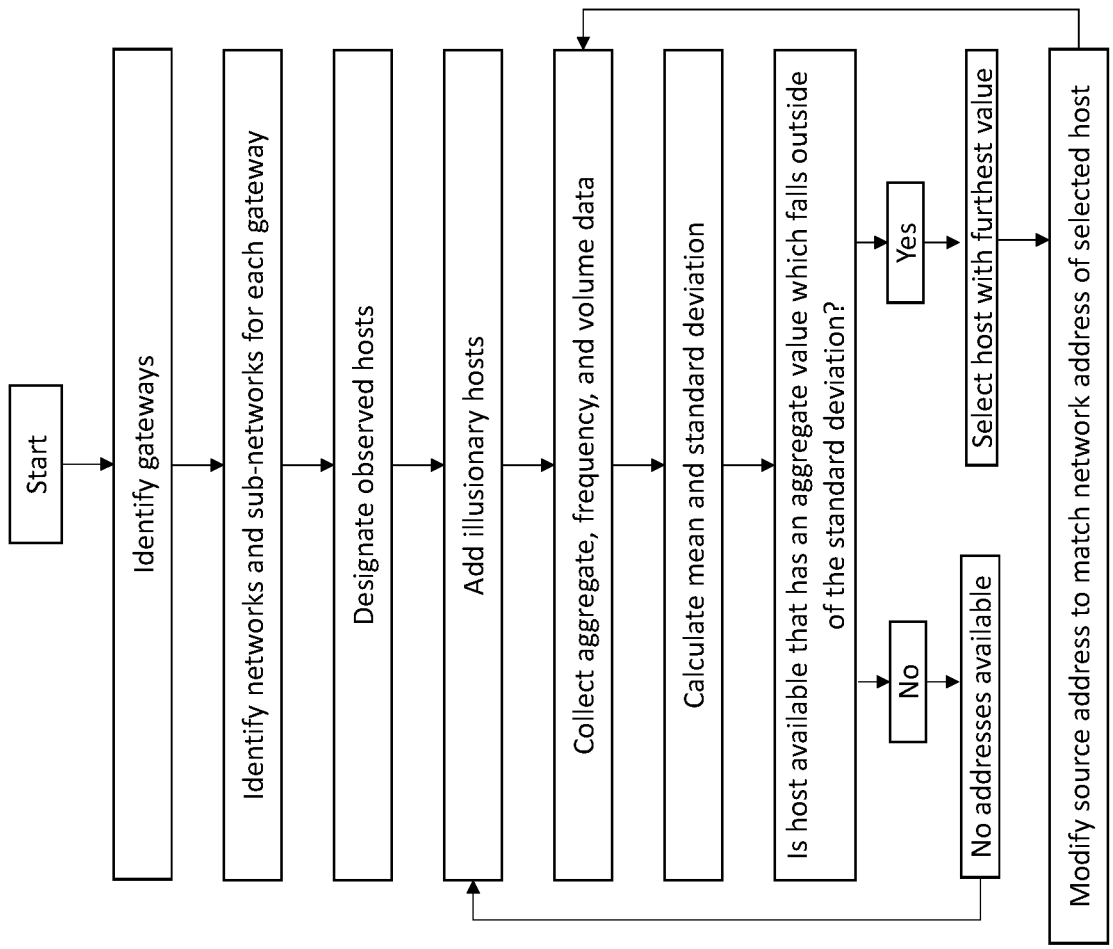
FIG. 3 is a flow chart with exemplary logic for creating the illusion network pathways.

FIG. 1 illustrates an exemplary real network pathway 11, FIG. 2 illustrates the real network pathway of FIG. 1 with exemplary illusion network pathways 100, and FIG. 3 is a flow chart with exemplary logic for creating the illusion network pathways 100. The disclosed system and method is intended to, for example without limitation, aid in the masking of network behavior. The real path 11 of network traffic flows from a real point of origin 12 to a real point of destination 14. The network may be an IP network, though any type of network operating under any set of protocols is contemplated. Individual datagrams may flow through multiple gateways 16 and over multiple networks 18, 20, 22, 24 to reach the real point of destination 14. In order to create the illusion of disparate sources of origins for such network traffic, the real path 11 may be carefully examined such that the imaginary paths may be established which conform, at least in some ways, with the real pathway 11 in order to appear plausible.

Each gateway 16 located along the real transmission pathway 11 may be identified. A comprehensive list of gateways 16 to be, or actually, used by the real transmission pathway 11 may be generated. In exemplary embodiments, the gateways 16 may be identified by way of an ICMP request where the Time to Live (TTL) field of the IP header is manipulated. When one of the gateways 16 receives a datagram whose TTL file is zero, an error may be generated indicating that the datagram is being discarded. By requesting an echo response with the TTL set to zero, for example without limitation, the first gateway 16 may be configured to respond with an error message which is returned to the sender, such as the rear origin host 12. Repeating the operation with a TTL set to one greater than the previous datagram, the next gateway 16 may be identified. By repeating such steps, a list of all gateway 16 in the real path 11 may be generated. Though ICMP protocols and TTL fields are discussed, other protocols and methods for obtaining the identity of the gateways 16 is contemplated. Such error messages may be returned to a host other than the real origin host 12.

The network address of each gateway 16, as may be reported in the error messages received at the real origin host 12, may be broken into network and subnetwork numbers. This may allow the identification of the networks 18, 20, 22, 24 through which the network traffic is passing. As those of skill in the art will recognize, the gateways 16 involved are connected to some kind of network 18, 20, 22, 24, and by examining the network address of the gateways 16 it is possible to identify the networks 18, 20, 22, 24. Such analysis may be performed at the real origin host 12, though such is not required.

Once the networks 18, 20, 22, 24 and gateways 16 have been identified, a collection of network addresses may be generated for hosts 1-10. Such analysis may be performed at the real origin host 12, though such is not required. The collection of network addresses may contain at least two types of host machines 1-10 per identified network 18, 20, 22, 24. The first type of host 1-10 may be an observed machine 3, 6 operating within the network 18, 20, 22, 24. These hosts 3, 6 may be observed through its interaction with the real origin host 12. Each observed host 3, 6 may be in electronic communication with one of the gateways 16. Each of the observed hosts 3, 6 may be configured to monitor network traffic passing through the respective gateway 16. The second type of host may be an imaginary host 1-2, 4-5, 7-10 that may be selected only for its plausible existence within the identified networks 18, 20, 22, 24. These imaginary hosts 1-2, 4-5, 7-10 may be selected at random or through some other technique that assures their network address falls within the identified real path 11. The size of the collection may be extendable by subsequent events, and its starting size may be at least two imaginary hosts 1-2, 4-5, 7-10 per network 18, 20, 22, 24, though such is not required.

The illusion pathway 100 presented in FIG. 2 reflects the real pathway 11 from FIG. 1 as an example, without limitation. In the illustration in FIG. 2, there are two gateways 16, four networks 18, 20, 22, 24, 22, and ten network addresses 1-10 developed into the starting setup list.

In order for network behavior to be observed, there must be a strong correlation between the frequency and the amount of traffic between two identifiable points. The Pearson Correlation Coefficient, provided in Formula 1 below is an exemplary statistical method which may be used to measure these values.

$$r = \frac{SP_{xy}}{\sqrt{SS_x SS_y}} \qquad \text{Formula 1}$$

The size of the sum of products, provided in Formula 2 below, may be closely related to the strength of the correlation coefficient.

$$SP_{xy} = \sum(x - \bar{x})(y - \bar{y}) = \sum xy - \frac{(\sum x)(\sum y)}{n} \qquad \text{Formula 2}$$

The larger the value, either negative or positive, the larger the statistical identification. For an event to be less obvious, it is preferable for its observed value to fall farther away from the average observation. In other words, it is preferable for network activity to deviate from the mean as much as possible. When network traffic is scattered to a wide range of hosts 1-10, these hosts 1-10 may maintain a level of activity that significantly deviates from the observed network activity for the entire network. This may obfuscate the true structure of the network, such as but not limited to, the identify of the true source host 12 and the true destination host 14.

The list of network addresses generated may be examined to determine the frequency and volume of activity of the entire network as well as each host 1-10. Three descriptive statistical values may be collected, periodically or continuously, to generate at least the following values: the aggregate, mean, and standard deviation from the mean, which may be provided through use of Formula 3 and Formula 4, both of which are provided below.

$$SS_x = \sum(x - \bar{x})^2 = \sum x^2 - \frac{(\sum x)2}{n} \qquad \text{Formula 3}$$

$$s = \sqrt{\frac{SS_x}{n-1}} \qquad \text{Formula 4}$$

An origin address may be selected from the generated list of hosts 1-10 on the network. Traffic data may be collected to determine aggregate, frequency, and volume metrics. The mean and standard deviation of the traffic for the entire system may be determined. If no host 1-10 is available that has an aggregate value for its traffic which falls outside of the mean for the entire system by more than the standard deviation, then additional illusionary hosts 1-2, 4-5, 7-10 may be added. The illusionary hosts 1-2, 4-5, 7-10 may be actual host machines, or may be simply configured to appear as plausible host machines. If a host 1-10 is available that has an aggregate value for its traffic which falls outside the mean by at least the standard deviation for the entire system, then the host 1-10 with the aggregate value furthest from the mean value for the entire system may be selected. After a network address of one of the hosts 1-10 has been selected, the source network address of an outgoing network datagram may be changed to the selected network address value. This may cause any observers of network traffic to believe that the datagram originated at an illusionary host 1-2, 4-5, 7-10. Since the datagram may not contain sensitive information, the use of an incorrect source address may not cause issues for the transmission. However, any observing collection mechanism may not correlate the network activity with the true origin host 12.

After transmission, the statistical values may be updated. The statistical values may be updated after each transmission, or after various size batches of transmissions. Regardless, by adding the values of such recent transmissions and updating the aggregate, mean, and standard deviation values, it may be possible to determine if additional transmissions should continue to use, or avoid using, the currently selected network address. This cyclical process of monitoring, selecting, and adjusting header information may maintain the appearance of scattered background traffic.

While certain embodiments are described with respect to an IP network and/or TCP/IP protocols, any type of network and protocol is contemplated.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing device. The electronic devices may be personal computers, smartphone, tablets, databases, servers, or the like. The electronic connections described herein may be accomplished by wired or wireless means.

What is claimed is:

1. A method for scattering network traffic across a number of disparate hosts, said method comprising the steps of:
    identifying each of a number of gateways located along a real transmission pathway between a real point of origin host and a real point of destination host, wherein each of said gateways has a network address;
    identifying at least one observational host which is actually located along the real transmission pathway;
    identifying illusionary hosts, each having a network address which renders said illusionary hosts as appearing to be plausibly located along the real transmission pathway;
    generating a list of machines' network addresses for the real point of origin host, the real point of destination host, each of the gateways, each of the at least one observational host, and each of the illusionary hosts;
    collecting frequency and volume data for network traffic to and from each of the machines identified on the list;
    determining an aggregate value of the collected network traffic data for each individual one of the machines identified on the list;
    determining a mean of the collected network traffic data for all of the machines identified on the list;
    identifying a particular one of the machines from the list which is not the real point of origin host having the aggregate value which deviates furthest from the mean; and
    replacing a source address of an outbound datagram with the network address for the particular one of the machines.

2. The method of claim 1 further comprising the steps of:
    determining a standard deviation of the collected network traffic data for all of the machines identified on the list;
    determining that none of the machines have an aggregate value deviating from the mean by more than the standard deviation;
    identifying additional illusionary hosts, each having a network address which renders said additional illusionary hosts as appearing to be plausibly located along the real transmission pathway; and
    adding said additional illusionary hosts to the list.

3. The method of claim 1 wherein:
    each of the machines are located on one or more IP networks.

4. The method of claim 3 wherein:
    each of the machines are configured to operate under TCP/IP protocols.

5. The method of claim 4 wherein:
    the step of identifying each of the gateways comprises the sub-steps of:
        transmitting a datagram with a time to live ("TTL") value set to zero; and
        increasing the TTL value by one and transmitting an additional datagram.

6. The method of claim 5 further comprising the steps of:
    identifying a network and a sub-network for each of said gateways from the network addresses for the gateways, wherein the step of identifying the network and the sub-network for each of said gateways comprises the sub-steps of:
        identifying the network from a first portion of the network address; and
        identifying the sub-network from a second portion of the network address.

7. A system for scattering network traffic across a number of disparate hosts, said system comprising:
    a real transmission pathway comprising:
        a real origin host;
        a real destination host; and
        one or more gateways between said real origin host and said real destination host;
    one or more observation hosts located along said real transmission pathway, each in electronic communication with at least at least a respective one of said gateways, wherein said one or more observation hosts are configured to collect data on network traffic passing through the gateways; and
    one or more illusionary hosts, each in electronic communication with at least one of said gateways and having a network address which is configured to appear as being plausibly located along said real transmission pathway;
    wherein the real origin host or one of said observation hosts is configured to:
        calculate an aggregate value of network traffic for each of the number of disparate hosts on the real transmission pathway; and
        determine a mean value and a standard deviation value of the network traffic for all of the number of disparate hosts on the real transmission pathway;
    wherein the real origin host is configured to modify a source address of a datagram with a network address for an identified one of the number of hosts, wherein said identified host is associated with an aggregate value of network traffic which deviates from the mean by more than the standard deviation.

8. The system of claim 7 wherein:
said real origin host is configured to add additional illusionary hosts if no host is identified as having an aggregate value which deviates from the mean by more than the standard deviation.

9. The system of claim 8 wherein:
said identified one of the number of hosts is one of said disparate hosts having an aggregate value which deviates the most from the mean.

10. The system of claim 9 wherein:
said real origin host is configured to re-calculate the aggregate values, the mean, and the standard deviation following the transmission of the datagram.

11. The system of claim 7 wherein:
the real transmission pathway is located along one or more IP networks.

12. The system of claim 11 wherein:
each of said hosts and gateways are configured to operate using TCP/IP protocols.

13. The method of claim 1 wherein:
each of the illusionary hosts are located outside of the real transmission pathway.

14. The method of claim 1 wherein:
each of the illusionary hosts is connected to, but is not located directly along, the real transmission pathway.

15. The method of claim 1 wherein:
the step of identifying the particular one of the machines from the list which is not the real point of origin host having the aggregate value which deviates furthest from the mean comprises the subset of identifying the particular one of the machines from the list which is not the real point of origin host having the aggregate value which deviates furthest below the mean.

* * * * *